June 15, 1926.
E. CALUSINSKI
1,589,105
VEHICLE TIRE RIM
Filed Nov. 12, 1923
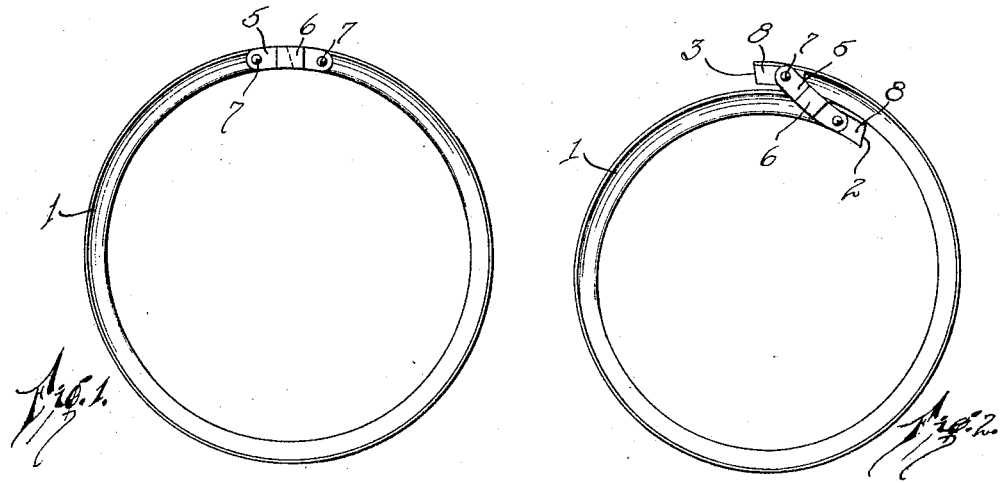
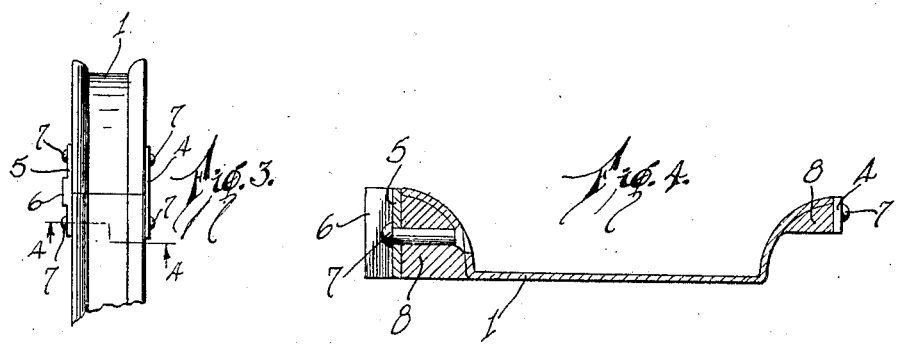
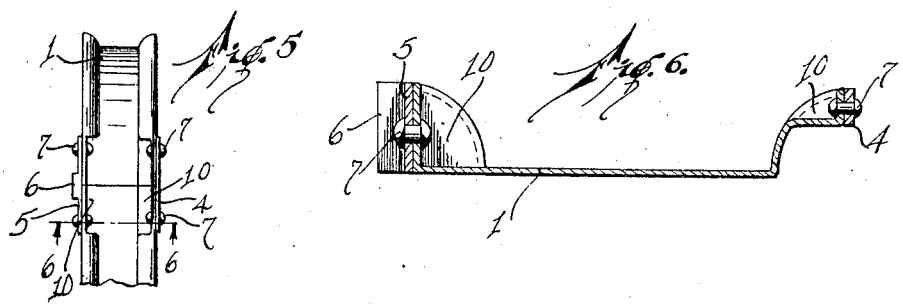
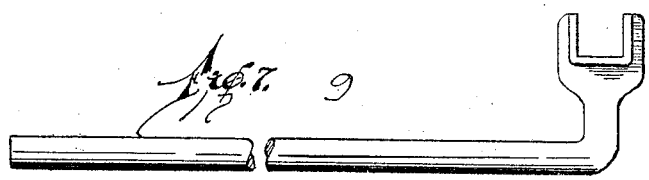
INVENTOR
E. Calusinski
BY
ATTORNEYS Patented June 15, 1926.

1,589,105

UNITED STATES PATENT OFFICE.

EDWARD CALUSINSKI, OF CHICAGO, ILLINOIS.

VEHICLE TIRE RIM.

Application filed November 12, 1923. Serial No. 674,248.

My invention relates to improvements in vehicle tire rims, and it consists in the combinations, constructions, and arrangements herein described and claimed.

An object of my invention is to provide a vehicle tire rim that may be readily collapsed so as to remove it from the tire, this operation being accomplished by the use of a single tool, which in this instance is a wrench.

A further object of my invention is to provide a device of the type described which is simple in construction, and in which the two ends of the rim are secured together at all times no matter whether the rim is in collapsed or extended position.

A further object of my invention is to provide a device of the type described in which the ends of the split rim are provided with projections having a number of functions. These functions reinforce the rim adjacent to the ends of the rim, act as stop members for the rim, provide sufficient body for carrying the link-receiving pins, and dispose the links flush with the outer edges of the rim, thereby permitting the rim to be readily swung into collapsed position.

Other objects and advantages will appear in the following specification, and the novel features of the invention will be particularly pointed out in the appended claim.

My invention is illustrated in the accompanying drawings, forming part of this application, in which Figure 1 is a side elevation of the device, Figure 2 is a side elevation of the device showing the rim in collapsed position, Figure 3 is a plan view of the portion of the rim at which the two ends of the rim are operatively connected together, Figure 4 is a section along the line 4—4 of Figure 3, Figure 5 is a plan view of a modified form of the device, Figure 6 is a section along the line 6—6 of Figure 5, and Figure 7 is a view of the wrench used with the device.

In carrying out my invention I provide a rim 1 that is cut so as to provide ends 2 and 3. These ends are connected to each other by links 4 and 5, (see Figure 3). It will be noted from Figure 3 that the link 5 is provided with a non-circular projection 6 for a purpose hereinafter described. The links 4 and 5 are identical with respect to each other except for this projection. The links are secured to the ends 2 and 3 of the rim 1 by means of rivets 7. It will be noted from Figure 4 that the portions of the rim adjacent to the rivets 7 are provided with blocks 8 through which the rivets extend. In this manner, the rivets are connected to the ends of the rim 1.

From the foregoing description of the various parts of the device, the operation thereof may be readily understood. When the rim is placed upon a wheel, the link 5 is disposed on the side of the wheel so as to position the projection 6 on the outer side of the wheel. Assume that it is desired to remove the rim from the tire. The socket of the wrench 9 is disposed over the non-circular projection 6 and the wrench is then swung, whereupon the link 5 will be swung from the position shown in Figure 1 into the position shown in Figure 2. When the link 5 is swung, it will also swing the link 4, whereupon the ends 2 and 3 of the rim will be swung into the position shown in Figure 2. The tire may now be readily removed. It will be noted that this operation of removing the rim is accomplished in much the same manner as a nut is turned by an ordinary wrench. In fact the projection 6 resembles a nut and is rotated by the wrench so as to swing the links 4 and 5. The spring tendency of the rim holds the links 4 and 5 when they are swung into the position shown in Figure 2 or when they are in the position shown in Figure 1.

It should be noted at this point that the projections 8 perform a quadruple function. In the first place, these projections reinforce the rim at the very point where the rim needs reinforcement. In the second place, the projections have wide abutting surfaces whereby the ends of the split rim are supported when the rim is swung into closed position. If it were not for these projections, the ends of the rim might overlap each other. Thirdly, the projections dispose the links flush with the outer edges of the rim, and therefore permit the links to be swung past the edges when the rim is collapsed. This obviates the necessity of slotting the rim for the passage of the links therethrough. Finally the links provide a broad supporting surface for the pins 7 that connect the links to the projections. This is also a vital feature because the pins must keep the two ends of the rim connected together during the entire life of the rim.

In Figures 5 and 6 I have shown a slightly modified form of the device, this form being identical with the preferred form with the exception that the rim itself is bent as at 10 so as to provide a surface that is adapted to carry the links 4 and 5. The operation of this form of the device is identical with the operation of the preferred form of the device, and therefore needs no further description. It will be noted that in this form of the device, the projections 8 are done away with, and instead, the metal in the rim is bent so as to provide a proper supporting surface.

I claim:

A split rim, said rim having a flange on each side thereof, rim reenforcing projections disposed at the ends of said rim and having their outer surfaces disposed flush with the outer edges of said flanges, said projections also acting as stops when the ends of said rim abut one another, links pivotally secured to said projections, pins securing said links to said projections, said pins being imbedded in said projections whereby said projections provide a solid foundation for said pins, said projections also disposing the inner surfaces of said links flush with the outer edges of said flanges for permitting the ready swinging of the links past the edges of the flanges.

EDWARD CALUSINSKI.